UNITED STATES PATENT OFFICE.

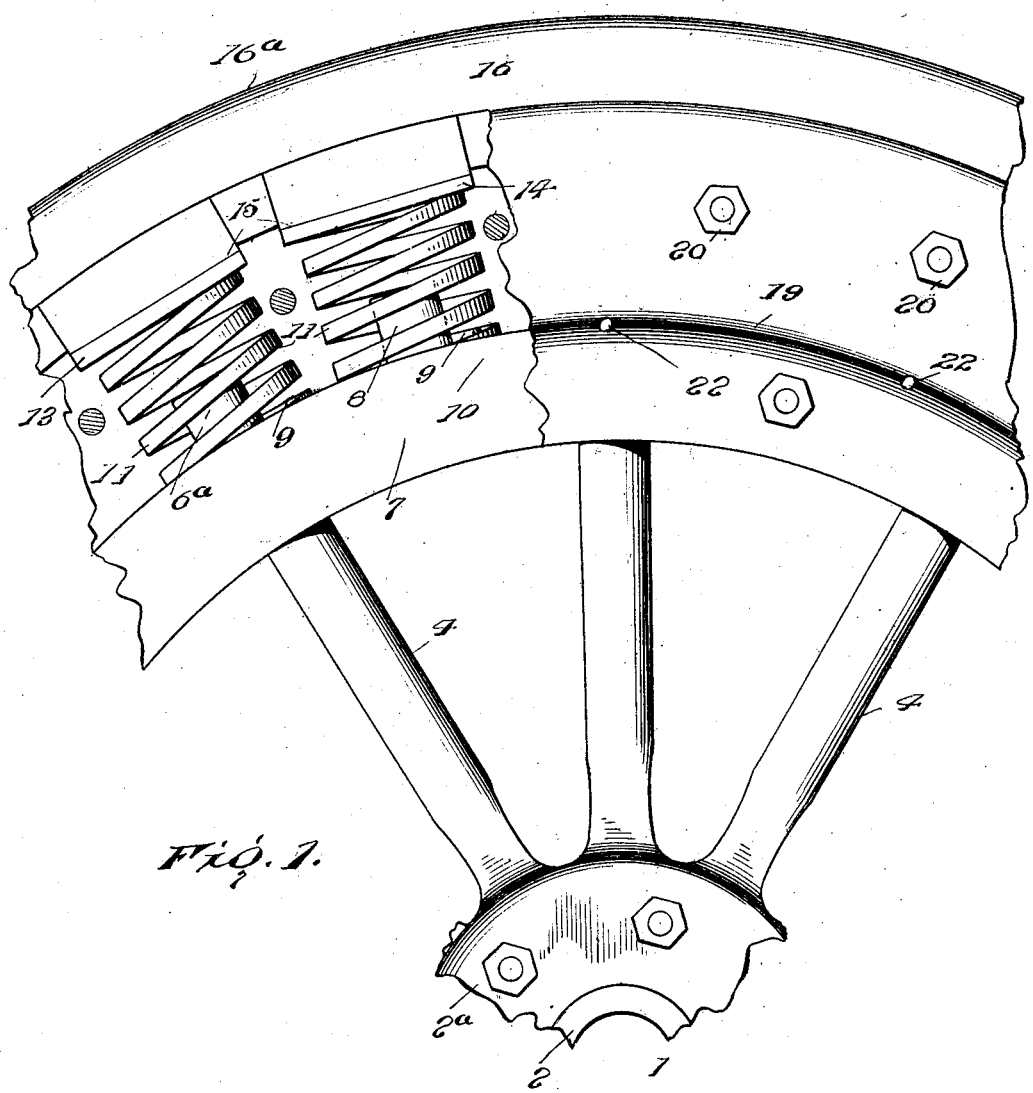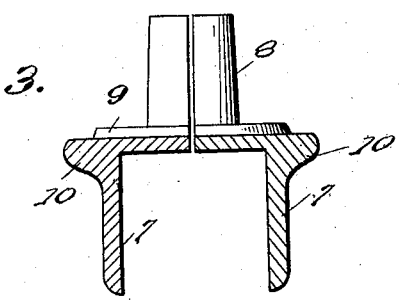

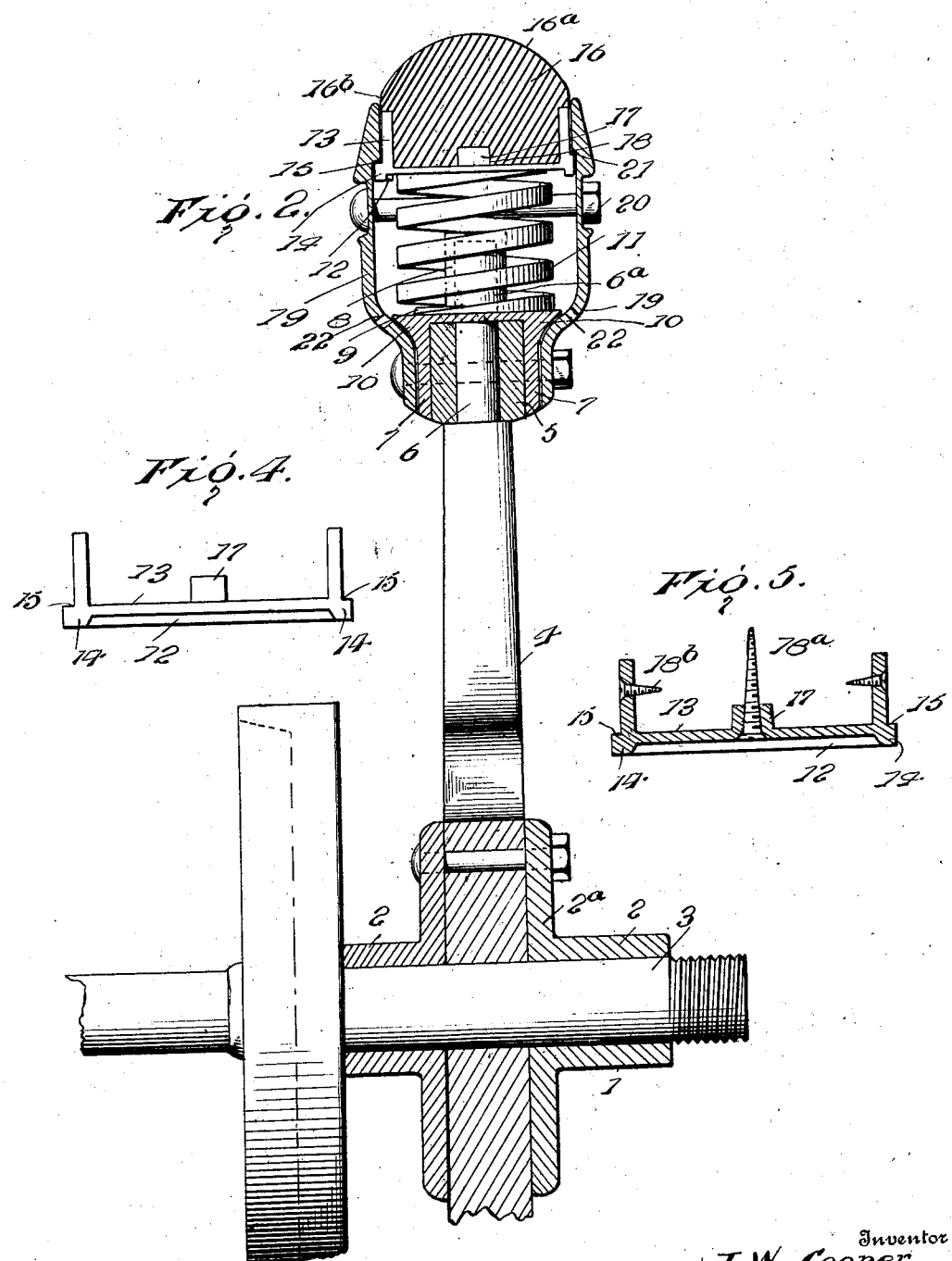

JOHN W. COOPER, OF BOSTON, MASSACHUSETTS.

SPRING-WHEEL.

No. 855,095.  Specification of Letters Patent.  Patented May 28, 1907.

Application filed August 27, 1906. Serial No. 332,253.

*To all whom it may concern:*

Be it known that I, JOHN W. COOPER, a citizen of the United States, residing at Boston, in the county of Suffolk and State of Massachusetts, have invented certain new and useful Improvements in Spring-Wheels, of which the following is a specification.

This invention contemplates certain new and useful improvements in spring wheels and the primary object of the invention is to provide a wheel of this character which will embody characteristics of durability, simplicity of construction and ease with which the parts may be assembled, lightness, extreme resiliency, while at the same time being devoid of the disadvantageous features that are inherent to resilient wheels employing pneumatic tires, which, while resilient, are susceptible to punctures and other unfortunate results.

With these and other objects in view, as will more readily appear as the description proceeds, the invention consists in certain constructions, arrangements and combinations of the parts hereinafter described, and particularly pointed out in the appended claims.

For a full understanding of the invention and the merits thereof and also to acquire a knowledge of the details of construction of the means for effecting the result, reference is to be had to the following description and accompanying drawings, in which:

Figure 1 is a side elevation of a portion of a vehicle wheel embodying the improvements of my invention, one of the side plates being partially broken away to show the interior construction; Fig. 2 is a transverse sectional view of my improved wheel; Fig. 3 is a detail transverse sectional view illustrating the two separable members of which the inner rim of the wheel is composed; Fig. 4 is a detail transverse section of one form of shoe employed, said shoes being arranged in series to comprise the outer rim of the wheel; and, Fig. 5 is a similar view of a modified form of shoe.

Corresponding and like parts are referred to in the following description and indicated in all the views of the drawings by the same reference characters.

Referring to the drawing, the numeral 1 designates the hub of my improved wheel which, as shown, comprises two hub members 2 arranged in spaced apart relation to each other and adapted to receive the spindle or axle 3, and 4 designates the spokes which are secured at their innermost ends between the annular flanges 2ª of the hub members 2, by means of bolts or the like, as shown.

5 designates the felly which may be composed of wood in the usual sections, said sections being provided with apertures to receive the tenons 6 at the outer ends of the spokes 4. The tenons 6 are extended as indicated at 6ª and they extend entirely through the wooden felly 5 and project beyond the same, and they, also, extend through the inner rim members 7 and into socket pieces or tubular bosses 8 projecting outwardly from and preferably integral with the rim members 7. As shown best in Fig. 3, these inner rim members are constructed in separable sections adapted to fit together on opposite sides of the wooden felly sections 5 to which they are rigidly secured, and they are angular in cross section, as shown, so as to extend along the sides of the sections as well as over the upper surface of the latter, while their tubular bosses 8 are preferably each semicircular and meet at their edges to entirely inclose the extensions 6ª of the tenons 6. In addition to the tubular bosses 8, the inner rim members 7 are, together, formed with annular protuberances 9 on their upper or outer surface at the base of the said bosses 8. Preferably the rim members 7 are thickened at their corners and extend outwardly from their main sides with a bevel as indicated at 10.

A series of helical springs 11 have their inner ends fitted around the protuberances 9 and are thereby kept in place, and the outer ends of said springs fit snugly within shallow sockets 12 in the lower face of the shoes 13, which, together as a series, constitute the outer rim of the wheel. These shoes are, as best shown in Fig. 4, provided with rim flanges 14, the upper surfaces of which constitute upwardly facing shoulders 15. The springs 11 encircle the bosses 8 and the extensions of the tenons where closed by said bosses, as best seen in Fig. 2.

The rubber or similar tire of the wheel, constructed according to the principles of my invention, is preferably solid or a cushion tire in contradistinction to a pneumatic tire and is designated 16. It fits within the side rims of shoes 13, extending circumferentially around the wheel from one shoe to the other, and the said shoes are provided with centrally located studs or nibs 17 fitting in corresponding openings 18 in the tire so as to assist in preventing the "creeping" of the tire around the tire rim of the wheel. If desired, the nibs 17 may be reinforced in their function by means of screws 18ª which, preferably, constitute extensions of the said nibs, such screws being illustrated in detail in Fig. 5 and being designed to extend firmly into the body of the tire. Also, if desired, this action of the screws and nibs may be further reinforced or aided by means of side screws 18ᵇ extending bodily into the tire and also illustrated in Fig. 5. These screws, however, are merely modifications of my invention and I do not consider that they are indispensable.

19 designates two annular side plates that extend entirely around the wheel on both sides of the inner and outer tires thereof, said side plates being preferably secured to the inner rim and the felly embraced thereby by means of the same bolts that secure the said inner rim to the felly. These side plates are also secured together so as to properly fasten the parts, by means of bolts 20 connecting them together near their outer edges, and said bolts occupy the spaces between the series of helical springs 11 and therefore interfere in no wise with the proper action of the springs. The plates 19 are formed near their outer edges with annular inwardly facing shoulders 21 coacting with the outwardly facing shoulders 15 of the shoes 13. It will be seen that the arrangement of parts above described and shown in the accompanying drawings, with respect to the shoulders 15 and the coacting overlying shoulders 21, provides that the latter shoulders will limit the outward movement of the respective shoes, but will permit the inward movement of the latter, and thereby producing the proper resilient action and preventing an undue outward movement of the parts under tension of the springs 11. In the preferred proportion of the parts, the tire 16 is formed with a substantially semicircular tread portion 16ª and two flat side surfaces 16ᵇ which project beyond the outer edges of the plates 19. Hence, in the actual operation of the wheel, those portions thereof that come into contact with the ground as the wheel turns will be compressed and the tread portion 16ª will be partially flattened out, while the flat surface 16ᵇ will be spread outward over the rounded ends of the side plates 19 and consequently the space between the said edges and the side rims of the shoes 13 will be closed and all water and moisture will be effectively excluded. While this is the case, I have provided drains for the interior of the wheel, as in case of any severe wear, moisture might gain access to the interior parts. These drains are simply orifices located in the side plates, preferably near the inner ends thereof or where said side plates extend toward each other and under the beveled thickened corners of the sides of the inner rim members 7. They are designated 22.

From the foregoing description in connection with the accompanying drawings, it will be seen that I have provided a very strong and yet very light construction of vehicle wheel, which possesses the characteristic of extreme resiliency, while at the same time it is durable and is therefore well adapted for vehicles of all description, no matter how light or heavy the vehicle may be and no matter what reasonable extent of wear or weight is imposed upon the wheel.

Having thus described the invention, what is claimed as new is:

1. In a vehicle wheel, the combination of an inner and an outer rim, the outer rim comprising a series of independent shoes provided on their inner surface with sockets, the inner rim being formed with a series of protuberances on its outer surface, a series of helical springs, the outer ends of which are received in said sockets, and the inner ends of which surround the said protuberances, a tire received in the outer rim, and means for limiting the outward movement of the said outer rim.

2. A vehicle wheel, comprising a hub, a series of spokes secured to said hub, said spokes being provided with extended tenons, a felly through which said tenons extend and beyond which they project, a tubular inner rim, angular in cross section and embracing said felly, the said rim being provided with tubular bosses accommodating the projecting ends of said tenons, an outer rim, a tire in said outer rim, and springs interposed between said outer rim and said inner rim.

3. A vehicle wheel comprising a hub, a series of spokes connected to said hub and provided with extended tenons at their outer ends, a felly through which said tenons extend and beyond which they are projected, an inner rim secured to said felly and provided with tubular bosses housing the projecting ends of said tenons and also provided with annular protuberances on their outer surface, an outer rim constituting a series of shoes provided with sockets in their lower faces, a tire received in said shoes, and helical springs interposed between said shoes and the inner rim, the outer ends of said springs being received in said sockets and the inner ends of said springs encircling the said protuberances.

4. A vehicle wheel, comprising a hub, a series of spokes secured to said hub, said spokes being provided with extended tenons, a felly through which said tenons extend and beyond which they project, a tubular inner rim angular in cross section and embracing said felly, the said rim being provided with tubular bosses accommodating the projecting ends of said tenons, an outer rim consisting of a series of independent shoes provided on their inner faces with sockets and also provided with rim flanges which produce outwardly facing shoulders, coil springs having their outer ends fitted in said sockets and their inner ends encircling the tubular bosses of the inner rim, and side plates secured to opposite sides of the said inner rim and secured together between the said springs, the outer ends of said side plates being formed with inwardly facing shoulders adapted to co-act with the outwardly facing shoulders of the outer rim, and a tire held in said outer rim.

5. A vehicle wheel comprising a hub, a series of spokes secured to said hub, said spokes being provided with extended tenons, a felly through which said tenons extend and beyond which they project, a tubular inner rim constructed in mating side sections adapted to embrace said felly, the said sections being provided with tubular bosses adapted to fit around the projecting ends of said tenons, an outer rim, a tire in said outer rim, and springs interposed between said outer rim and said inner rim.

In testimony whereof I affix my signature in presence of two witnesses.

JOHN W. COOPER. [L. s.]

Witnesses:
GERTRUDE K. DONOAN,
JONATHAN T. HOWARD.